US012670323B2

(12) United States Patent (10) Patent No.: US 12,670,323 B2
Anderson et al. (45) Date of Patent: Jun. 30, 2026

(54) GOLDEN PROMPT GENERATION BASED ON AUTHORITATIVE PUBLICATIONS

(71) Applicant: Google LLC, Mountain View, CA (US)

(72) Inventors: Geoffrey Anderson, Toronto (CA);
Roman Arcea, Velserbroek (NL)

(73) Assignee: Google LLC, Mountain View, CA (US)

( * ) Notice: Subject to any disclaimer, the term of this patent is extended or adjusted under 35 U.S.C. 154(b) by 204 days.

(21) Appl. No.: 18/461,469

(22) Filed: Sep. 5, 2023

(65) Prior Publication Data

US 2025/0077776 A1 Mar. 6, 2025

(51) Int. Cl.
| | |
|---|---|
| *G06F 40/284* | (2020.01) |
| *G06F 16/953* | (2019.01) |
| *G06F 40/30* | (2020.01) |
| *G06F 40/40* | (2020.01) |

(52) U.S. Cl.
CPC .......... *G06F 40/284* (2020.01); *G06F 16/953* (2019.01); *G06F 40/30* (2020.01); *G06F 40/40* (2020.01)

(58) Field of Classification Search
CPC ... G10L 15/063; G10L 15/1815; G10L 15/22; G10L 25/63; G10L 2015/0635
See application file for complete search history.

(56) References Cited

U.S. PATENT DOCUMENTS

| | | | | |
|---|---|---|---|---|
| 12,118,324 B1 * | 10/2024 | Zhang | .................. | G06F 16/355 |
| 2023/0360636 A1 * | 11/2023 | Fan | ....................... | G10L 15/063 |

| | | | | |
|---|---|---|---|---|
| 2024/0095463 A1 * | 3/2024 | Leary | ..................... | G06F 40/20 |
| 2024/0330446 A1 * | 10/2024 | Bulut | ................... | G06N 3/0895 |
| 2025/0217418 A1 * | 7/2025 | Bathwal | ............ | G06F 16/24575 |

OTHER PUBLICATIONS

International Search Report and Written Opinion issued in related PCT Application No. PCT/US2024/044977, dated Oct. 25, 2024.
Piotrowski Maciej: "Evaluating Large language model applications with LLM-augmented feedback", dataroots.io blog, Aug. 2, 2023 (Aug. 2, 2023), pp. 1-11, XP093215996.

(Continued)

*Primary Examiner* — Pierre Louis Desir
(74) *Attorney, Agent, or Firm* — Shumaker & Sieffert, P.A.

(57) ABSTRACT

A method for golden prompt generation based on authoritative publications includes receiving an initial authoritative publication associated with a specific topic. The method includes retrieving, using the initial authoritative publication additional authoritative publications associated with the specific topic. The method includes generating, using natural language processing, a set of golden prompts from the set of authoritative publications. Each golden prompt of the set of golden prompts includes text from the set of authoritative publications. The method includes fine-tuning a pre-trained model using the set of authoritative publications. The method includes generating, using the fine-tuned model and the set of golden prompts, a set of predictions. The method includes determining, using the set of predictions and the set of authoritative publications, an error rate of the fine-tuned model. The error rate indicates a similarity between the set of predictions and the set of authoritative publications.

18 Claims, 7 Drawing Sheets

(56) References Cited

OTHER PUBLICATIONS

Anonymous: "dataroots.io blog table of contents", dataroots.io blog, Aug. 2, 2023 (Aug. 2, 2023), pp. 1-14, XP093215997, URL:https://dataroots.io/blog [retrieved on Oct. 17, 2024].

Lazaridou, Angeliki: "Internet-augmented language models through few-shot prompting for open-domain question answering", https://doi.org/10.48550/arXiv.2203.05115, arXiv:2203.05115v2 [cs.CL] , published on Feb. 2, 2023, 20 pages.

Wolfe, Cameron R: "Specialized LLMs: ChatGPT, LaMDA", <https://drive.google.com/file/d/1TLyZ-VHSe7yLiqqe0KBJaMf6zhur0HBY/view?usp=drive_link> Galactica, Codex, Sparrow, and More, <https://towardsdatascience.com/specialized-llms-chatgpt-lamda-galactica-codex-sparrow-and-more-ccccdd9f666f> ed-llms-chatgpt-lamda-galactica-codex-s, published in Towards Data Science, on Jan. 14, 2023.

Pangu, Eileen: "How to Use Large Language Models", <https://towardsdatascience.com/how-to-use-large-language-models-llm-in-your-own-domains-b4dff2d08464>, published in "Towards Data Science", on Mar. 20, 2023.

Du et al., "Learning to ask: Neural question generation for reading comprehension", arXiv preprint arXiv:1705.00106, Apr. 29, 2017, 11 pp.

Sun et al., "How to fine-tune BERT for text classification?", arXiv:1905.05583v3, Feb. 5, 2020, 10 pp.

* cited by examiner

GOLDEN PROMPT GENERATION BASED ON AUTHORITATIVE PUBLICATIONS

TECHNICAL FIELD

This disclosure relates to golden prompt generation based on authoritative publications.

BACKGROUND

The fields of information retrieval and natural language processing are increasingly important with the advent of large language models and other neural networks. These models are often evaluated for accuracy on specific topics through the use of "golden prompts" or questions. These golden prompts consist of questions that can be accurately answered by content of an authoritative publication. Generally, these prompts are generated or labeled by humans and then provided to the model for evaluation.

SUMMARY

One aspect of the disclosure provides a computer-implemented method for golden prompt generation based on authoritative publications, that when executed by data processing hardware, causes the data processing hardware to perform operations. The operations include receiving an initial authoritative publication associated with a specific topic and retrieving, using the initial authoritative publication, additional authoritative publications associated with the specific topic. The initial authoritative publication and the additional authoritative publications form a set of authoritative publications. The operations include generating, using natural language processing, a set of golden prompts from the set of authoritative publications. Each golden prompt of the set of golden prompts includes text from the set of authoritative publications. The operations include fine-tuning a pre-trained model using the set of authoritative publications and generating, using the fine-tuned model and the set of golden prompts, a set of predictions. The operations also include determining, using the set of predictions and the set of authoritative publications, an error rate of the fine-tuned model. The error rate indicates a similarity between the set of predictions and the set of authoritative publications.

Implementations of the disclosure may include one or more of the following optional features. In some implementations, the pre-trained model includes a large language model. Receiving the initial authoritative publication may include receiving, from a user, a request to fine-tune the pre-trained model using the initial authoritative publication. Optionally, retrieving the additional authoritative publications includes using at least one of a search engine or a web crawler.

In some examples, retrieving the additional authoritative publications includes searching a public database or searching a private database. Determining the error rate may include determining an amount of matching between tokens representing the set of predictions to tokens representing the authoritative publications.

In some implementations, the operations further include determining that the error rate of the fine-tuned model fails to satisfy an error rate threshold. Based on determining that the error rate of the fine-tuned model fails to satisfy the error rate threshold, the operations may further include selecting a proper subset of authoritative publications from the set of authoritative publications; generating, using natural language processing, a second set of golden prompts from the proper subset of authoritative publications; fine-tuning a second pre-trained model using the proper subset of authoritative publications; generating, using the second fine-tuned model and the second set of golden prompts, a second set of predictions; and determining, using the second set of predictions and the proper subset of authoritative publications, a second error rate of the second fine-tuned model. In some of these implementations, selecting the proper subset of authoritative publications is based on a credibility of each authoritative publication in the set of authoritative publications.

In some examples, the operations further include sorting the set of authoritative publications based on a credibility of each authoritative publication of the set of authoritative publications. In some of these examples, fine-tuning the pre-trained model is based on the credibility of each authoritative publication of the set of authoritative publications.

Another aspect of the disclosure provides a system for golden prompt generation based on authoritative publications. The system includes data processing hardware and memory hardware in communication with the data processing hardware. The memory hardware stores instructions that when executed on the data processing hardware cause the data processing hardware to perform operations. The operations include receiving an initial authoritative publication associated with a specific topic and retrieving, using the initial authoritative publication, additional authoritative publications associated with the specific topic. The initial authoritative publication and the additional authoritative publications form a set of authoritative publications. The operations include generating, using natural language processing, a set of golden prompts from the set of authoritative publications. Each golden prompt of the set of golden prompts includes text from the set of authoritative publications. The operations include fine-tuning a pre-trained model using the set of authoritative publications and generating, using the fine-tuned model and the set of golden prompts, a set of predictions. The operations also include determining, using the set of predictions and the set of authoritative publications, an error rate of the fine-tuned model. The error rate indicates a similarity between the set of predictions and the set of authoritative publications This aspect may include one or more of the following optional features. In some implementations, the pre-trained model includes a large language model. Receiving the initial authoritative publication may include receiving, from a user, a request to fine-tune the pre-trained model using the initial authoritative publication. Optionally, retrieving the additional authoritative publications includes using at least one of a search engine or a web crawler.

In some examples, retrieving the additional authoritative publications includes searching a public database or searching a private database. Determining the error rate may include determining an amount of matching between tokens representing the set of predictions to tokens representing the authoritative publications.

In some implementations, the operations further include determining that the error rate of the fine-tuned model fails to satisfy an error rate threshold. Based on determining that the error rate of the fine-tuned model fails to satisfy the error rate threshold, the operations may further include selecting a proper subset of authoritative publications from the set of authoritative publications; generating, using natural language processing, a second set of golden prompts from the proper subset of authoritative publications; fine-tuning a second pre-trained model using the proper subset of authoritative publications; generating, using the second fine-tuned model and the second set of golden prompts, a second set of predictions; and determining, using the second set of predictions and the proper subset of authoritative publications, a second error rate of the second fine-tuned model. In some of these implementations, selecting the proper subset of authoritative publications is based on a credibility of each authoritative publication in the set of authoritative publications.

In some examples, the operations further include sorting the set of authoritative publications based on a credibility of each authoritative publication of the set of authoritative publications. In some of these examples, fine-tuning the pre-trained model is based on the credibility of each authoritative publication of the set of authoritative publications.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

The surge in use of large language models (LLM) and other neural networks has exposed a number of interrelated challenges in the fields of information retrieval and natural language processing. Specifically, fields related to the accuracy and efficiency of information understanding and response generation by artificial intelligence (AI) systems are increasingly important.

One primary challenge is the accurate and efficient discovery of authoritative and relevant information sources from the vast amounts of data available (e.g., via the Internet). This challenge involves not just finding and retrieving the relevant information, but also determining the relevance and credibility of the information. Generation of relevant or pertinent questions is another challenge. Evaluating these models requires questions that can be accurately answered by the content of authoritative publications, as these questions serve as the "gold standard" for testing the comprehension and factual accuracy of AI systems.

Additionally, many models, such as LLMs, must be fine-tuned to accurately understand and respond to specific information from authoritative sources. However, while fine-tuning models with targeted information can enhance performance, this requires efficient systems to provide any scalability. Assessing response accuracy of these models is yet another challenge. Evaluating the factual accuracy of AI-generated responses in relation to specific authoritative sources is difficult with traditional evaluation methods that often fail to provide sufficient detail about a model's understanding of specific facts from a given authoritative source.

Traditional information retrieval systems have limited capacity for identifying and processing authoritative publications on specific topics or products. Further, fine-tuning large language models or the like with the information from such publications and validating the responses is challenging and lacks scalability.

Implementations herein are directed toward a model generator that improves and automates the process of training and evaluating AI systems and models for information comprehension and response generation. The model generator identifies authoritative information on a specific topic or product, trains or fine-tunes a model to accurately respond to high-confidence prompts, and evaluates responses from the model for factual accuracy. The model generator is useful, for example, to replace manual data collection, manual turk based refinement and answer scoring, and other similar disconnected processes.

Figure 1:
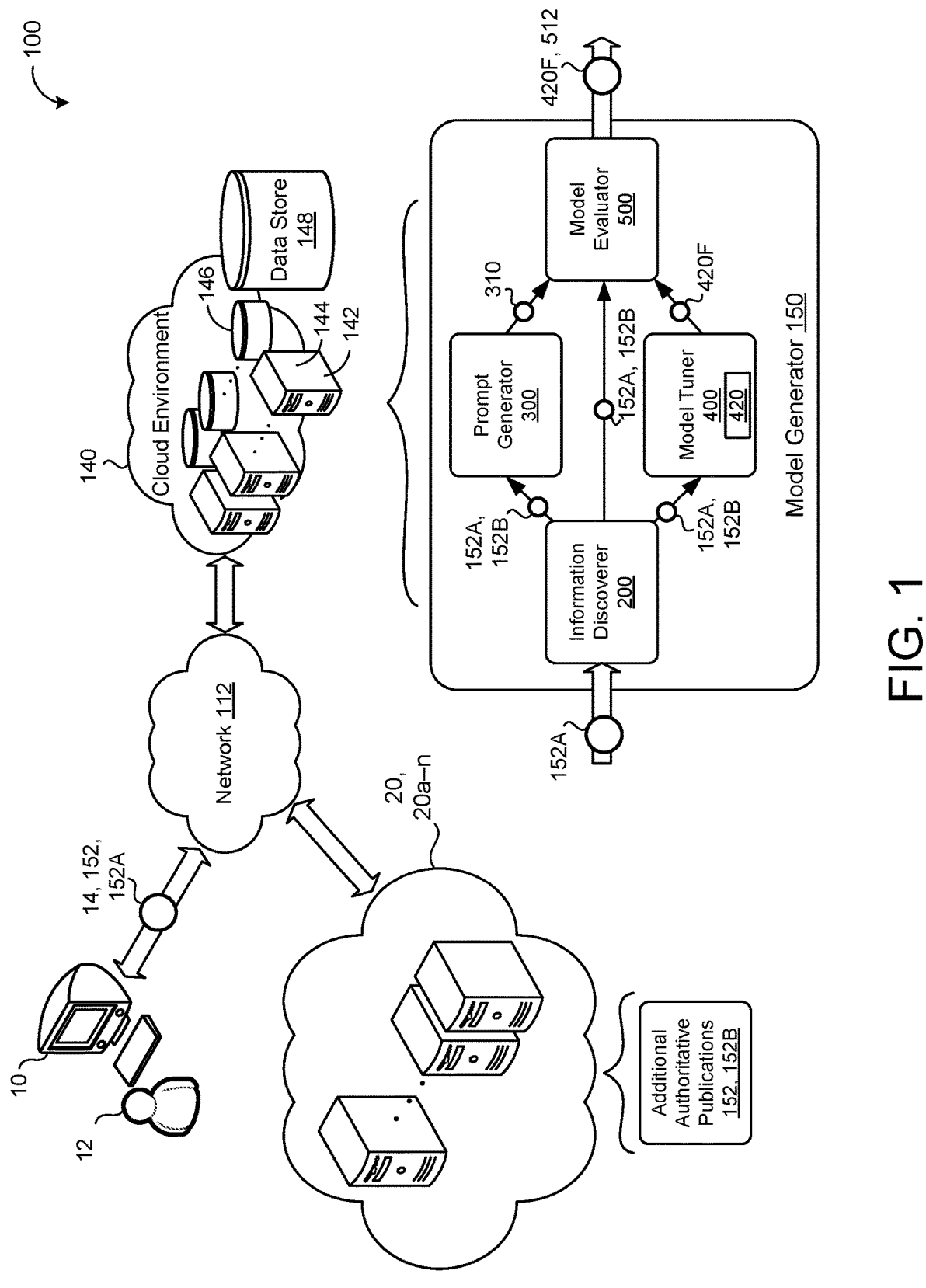
FIG. 1 is a schematic view of an example system for golden prompt generation based on authoritative publications.

Referring to FIG. 1, in some implementations, an information discovery and model generation system 100 includes a remote system 140 in communication with one or more user devices 10 each associated with a respective user 12 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 148 (i.e., a remote storage device) may be overlain on the storage resources 146 to allow scalable use of the storage resources 146 by one or more of the clients (e.g., the user device 10) or the computing resources 144. The remote system 140 is configured to communicate with the user devices 10 via, for example, the network 112. The user device(s) 10 may correspond to any computing device, such as a desktop workstation, a laptop workstation, or a mobile device (i.e., a smart phone).

The remote system 140 executes a model generator 150. The model generator 150 receives an initial or original authoritative publication 152, 152A. For example, the model generator 150 receives the initial authoritative publication 152A via a request 14 from the user device 10 and/or user 12. The request 14 may request that the model generator 150 fine-tune and evaluate a model 420 (FIG. 4) based on a specific topic or product or other subject matter associated with the initial authoritative publication 152A. For example, the initial authoritative product 152A is associated with a particular product of a company, such as a manual, reference guide, a design document, etc. of the particular product. The model generator 150 may receive the initial authoritative publication 152A directly (e.g., via the request 14) or may receive a location of the initial authoritative publication 152A, and the model generator 150 may retrieve the initial authoritative publication 152A from the location.

The model generator 150 includes an information discoverer module 200. The information discoverer 200 retrieves, using the initial authoritative publication 152A, one or more additional authoritative publications 152, 152B associated with the same product or topic of the initial authoritative publication 152A. The information discoverer 200 may retrieve the additional authoritative publications 152B via searching one or more servers 220, 220*a-n* via one or more private networks (e.g., intranets) or one or more public networks (e.g., the Internet). For example, when the initial authoritative publication 152A is an internal design document for a product of a business, the information discoverer 200 searches internal data repositories to uncover and retrieve additional authoritative publications 152B associated or focused on the same product. Additionally or alternatively, the information discoverer 200 searches public networks, such as the Internet for the additional authoritative publications 152B.

The information discoverer 200 may use any number of search engines, web crawlers, and the other information discovery tools to find the additional authoritative publications 152B. The request 14 may include additional parameters for the information discoverer 200 to use to discover the additional authoritative publication 152B. For example, the request 14 includes parameters such as user names associated with one or more people authoritative on the specific topic or product, social media accounts of the one or more people, additional keywords or information related to the specific topic or product, relevant date ranges for the authoritative publications, etc.

As an example, the request 14 requests that the model generator 150 generate and evaluate a model that answers user questions about a device made by a company in order to improve customer service for the company. In this example, the information discoverer 200 finds authoritative publications 152 about the device from, for example, the device's user manual, an FAQ on the website of the company, reviews by tech experts, and other relevant documents. As another example, the request 14 is from a healthcare provider that requests that the model generator 150 generates and evaluates a model to answer questions about specific medical conditions. In this example, the information discoverer 200 searches for authoritative medical publications related to the specific medical conditions, such as clinical guidelines, research papers, and health authority advisories.

The model generator 150 includes a prompt generator 300. The prompt generator 300 receives the authoritative publications 152 (i.e., the initial authoritative publication 152A and any additional authoritative publications 152B discovered by the information discoverer 200) and, using the authoritative publications, generates one or more golden prompts 310. The prompt generator 300 generates each golden prompt 310 such that the answer to each golden prompt 310 can be derived directly from the content of the authoritative publications 152. That is, each golden prompt 310 provides a high probability of an accurate response from a model trained on the authoritative publications 152. In some examples, each golden prompt 310 includes text that is mostly or entirely present in one or more of the authoritative publications 152.

In some implementations, the prompt generator 300 uses natural language processing (NLP) techniques to comprehend and contextualize the authoritative publications 152 and to generate the golden prompts 310 that are written naturally and in a form coherent to humans. The prompt generator 300 may use deterministic algorithms for prompt generations, such as statistical and/or rule-based algorithms or techniques. In other examples, the prompt generator 300 uses one or more neural networks to provide NLP tasks. The prompt generator 300 uses one or more algorithms to consider the context, facts, and structure of the authoritative publications 152 to generate the golden prompts 310 with a high probability of accurate responses from a fine-tuned language model. In the example with the model that answers user questions about the device made by the company, the golden prompts 310 reflect a list of potential user questions regarding the product. In the example with the healthcare provider and the model to answer questions about the specific medical conditions, the golden prompts 310 reflect a list of typical questions patients ask about the specific medical conditions.

The model generator 150 also includes a model tuner 400. The model tuner 400, using the authoritative publications 152, fine-tunes or adjusts or otherwise partially retrains a pre-trained model 420. In some implementations, the pre-trained model 420 is a large language model (LLM). An LLM is generally trained on a diverse range of text (e.g., from the Internet) and can have its general capabilities increased using specific datasets. The model tuner 400 fine-tunes the pre-trained model 420 on the authoritative publications 152 to enable a fine-tuned model 420F to accurately respond to questions on the specific topic or product associated with the authoritative publications. For example, the model tuner 400 fine-tunes an LLM with authoritative publications 152 regarding a specific product so that the LLM can accurately answer detailed questions regarding the product or the model tuner 400 fine-tunes an LLM with authoritative publications 152 regarding a specific medical condition so that the LLM can accurately answer detailed questions regarding the specific medical condition.

The model generator 150 also includes a model evaluator 500. The model evaluator generates, using the fine-tuned model 420F and the golden prompts 310, a prediction 520 (FIG. 5) for each golden prompt 310. Each prediction 520 represents the prediction by the fine-tuned model 420F of the answer to the corresponding golden prompt 310. The model evaluator 500 determines, using the predictions 520 and the authoritative publications 152, an accuracy of the predictions 520. As discussed in more detail below, in some examples, the model evaluator 500 determines an error rate 512 for each prediction 520.

Figure 2:
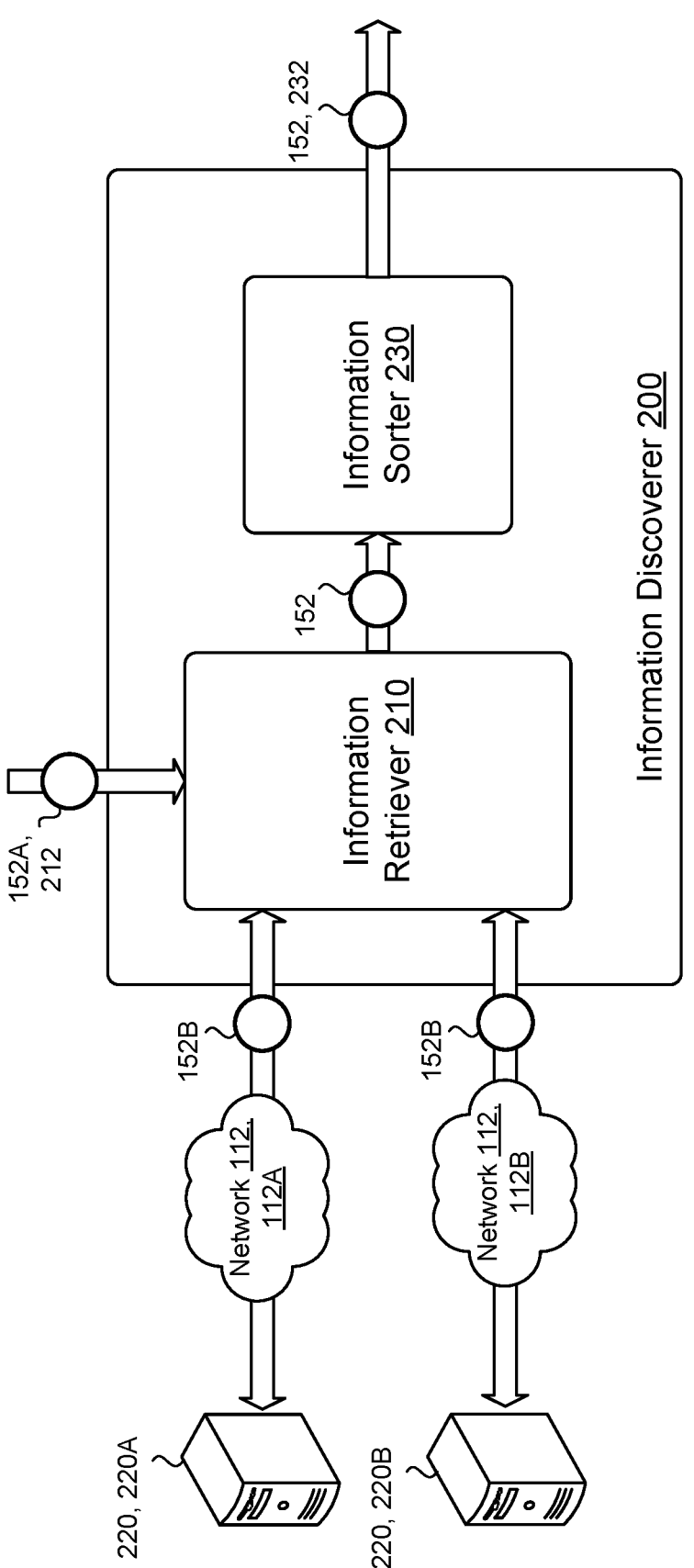
FIG. 2 is a schematic view of an exemplary information discoverer of the system of FIG. 1.

Referring now to FIG. 2, in some implementations, the information discoverer 200 includes an information retriever 210. The information retriever 210 retrieves additional authoritative publications 152B from a private server 220, 220A (i.e., a server not available to the general public) via a private network 112, 112A (e.g., a company's private intranet). Additionally or alternatively, the information retriever 210 retrieves additional authoritative publications 152B from a public server 220, 220B (i.e., a server available to the general public such as a server hosting a public webpage) via a public network 112B (e.g., via the Internet). The user 12 may tailor (e.g., via the request 14) which servers 220 the information retriever 210 uses to retrieve the additional authoritative publications 152B.

Optionally, the information retriever 210 retrieves the additional authoritative publications 152B without receiving the initial authoritative publications 152A. For example, instead of the initial authoritative publication 152A, the user 12 and/or the request 14 provide an indication of the specific topic or product (e.g., a name, a description, etc.) and the information retriever 210 uses the indication to retrieve the additional authoritative publications 152B.

In some examples, the information discoverer 200 includes an information sorter 230. The information sorter 230 uses one or more techniques to rank or sort the authoritative publications 152 based on relevance and/or credibility 232. The information sorter 230 may base the relevance on the content and/or source of the authoritative publication 152. The information sorter 230 may base the credibility 232 of the authoritative publication 152 based on the source and/or author of the authoritative publication 152. The credibility 232 may be divided into a number of tiers or categories. In some examples, the information sorter 230 categorizes each authoritative publication 152 as highly credible, moderately credible, or slightly credible. The information sorter 230 may use any number of categories and the number of categories may be based on the number of authoritative publications and/or tailored by the user 12. The user 12 may define the credibility categories and/or filter the categories (i.e., select a subset of authoritative publications 152 from the set of authoritative publications 152). For example, the information sorter 230 discards or ignores all authoritative publications 152 for a certain category of credibility based on the request 14.

As an example, the information sorter 230 categorizes the initial authoritative publication 152A, official manuals, design documents, etc., as a highly credible authoritative publication 152. Continuing this example, the information sorter 230 categorizes additional authoritative publications 152B from a website associated with a company of the product, articles from official partners, product reviews from official reviewers, etc., as moderately credible. The information sorter 230 may categorize additional authoritative publications 152B from blogs, social media, etc., as slightly credible. These examples are just one of many possible ways the information sorter may categorize and/or sort and/or rank the authoritative publications 152. The information sorter 230 may use techniques or algorithms (e.g., PageRank) to sort and/or categorize the authoritative publications 152. The information sorter 230 may include the ranking or credibility 232 of each authoritative publication 152 to the prompt generator 300, the model tuner 400, and/or the model evaluator 500.

Figure 3:
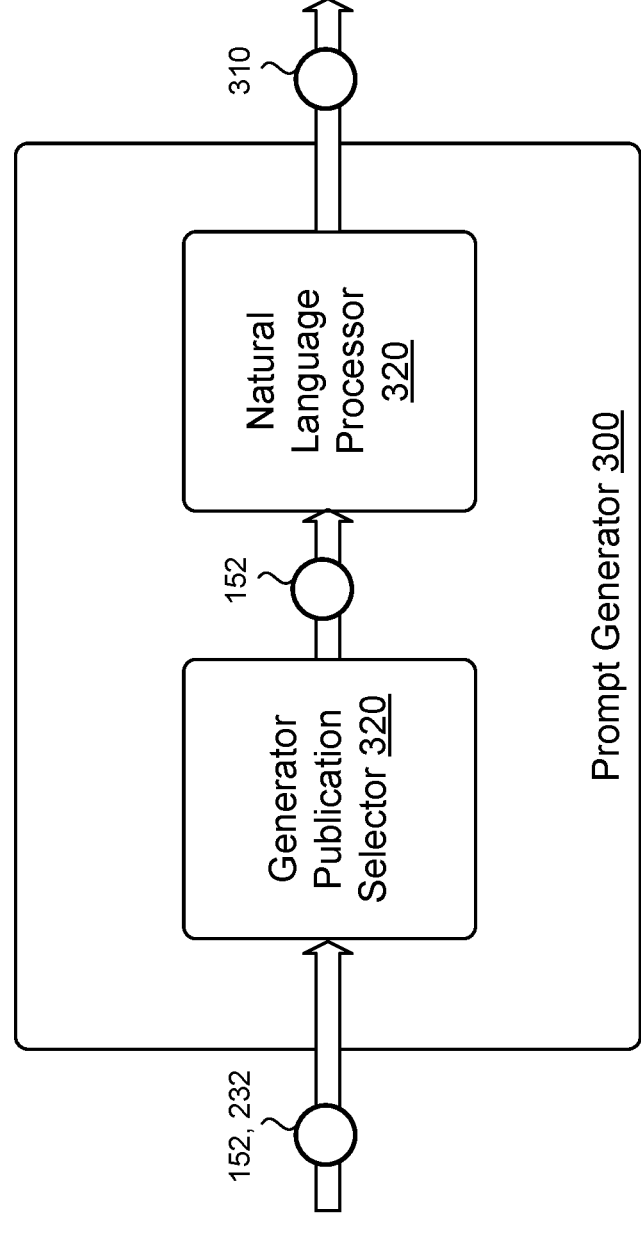
FIG. 3 is a schematic view of an exemplary prompt generator of the system of FIG. 1.

Referring now to FIG. 3, in some examples, the prompt generator 300 includes a generator publication selector 320. The generator publication selector 320 selects which authoritative publications 152 to draw on for the golden prompts 310. The generator publication selector 320 may filter the authoritative publications 152 based on the sorting or rank of the authoritative publications 152 (e.g., use a threshold amount of the top ranked authoritative publications 152). Additionally or alternatively, the generator publication selector 320 filters the authoritative publications 152 based on the credibility 232 of each authoritative publication 152. In some implementations, the generator publication selector 320 weights each authoritative publication 152 based on the rank or credibility 232. The filtering and/or weighting of the generator publication selector 320 may be configurable by the user 12. For example, the user 12 imposes strict filtering or weighting that encourages use of highly credible authoritative publications 152, which may reduce the quantity of golden prompts 310, but increase the accuracy or quality of the golden prompts 310. On the other hand, the user may impose less strict filtering or weighting that encourages use of all of the authoritative publications 152, which may increase the quantity of the golden prompts 310, but decrease the accuracy or quality of the golden prompts 310.

A natural language processor 330 receives the filtered and/or weighted authoritative publications 152 from the generator publication selector 320 and applies one or more NLP techniques to the authoritative publications 152 to generate the golden prompts 310. The techniques consider the context, facts, and structure of the authoritative publications 152 to generate the golden prompts 310 such that each golden prompt 310 has a high probability of accurate response from the fine-tuned model 420F.

Figure 4:
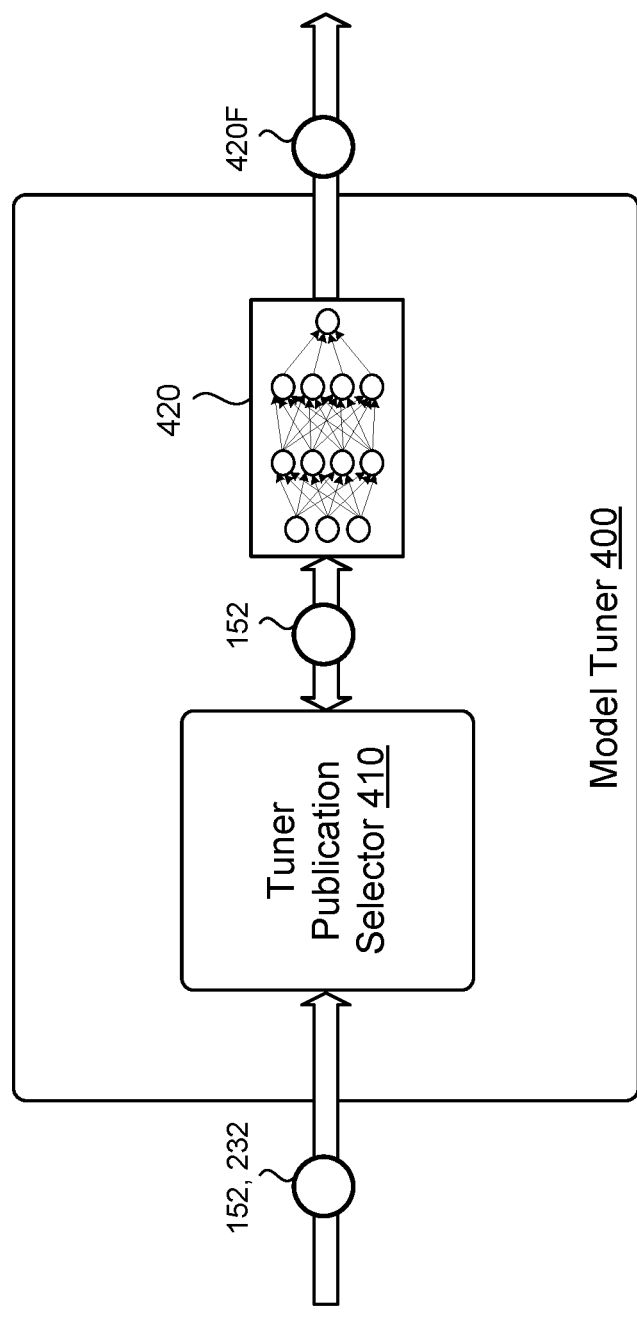
FIG. 4 is a schematic view of a model tuner of the system of FIG. 1.

Referring now to FIG. 4, in some examples, the model tuner 400 includes a tuner publication selector 410. Similar to the generator publication selector 320, the tuner publication selector 410 selects which authoritative publications 152 to draw on for the golden prompts 310 may filter the authoritative publications 152 based on the sorting or rank of the authoritative publications 152 (e.g., use a threshold amount of the top ranked authoritative publications 152). Additionally or alternatively, the tuner publication selector 410 filters the authoritative publications 152 based on the credibility 232 of each authoritative publication 152. In some implementations, the tuner publication selector 410 weights each authoritative publication 152 based on the rank or credibility 232.

In some examples, model tuner 400 fine-tunes the pre-trained model 420 based on the credibility 232 of each authoritative publication 152. That is, the tuner publication selector 410 may fine-tune the pre-trained model 420 (e.g., a pre-trained LLM) using the filtered and/or weighted authoritative publications 152. In this context, the weighting may control the impact each individual authoritative publication 152 has on the fine-tuning. For example, a highly credible authoritative publication 152 has a greater impact on the fine-tuning relative to a lower credible authoritative publication 152. That is, the pre-trained model 420, during the fine-tuning, may "learn" more from the highly credible authoritative publications 152 than from the slightly credible authoritative publications 152. The user 12 may configure or adjust the filtering and/or weighting of the authoritative publications 152. For example, the user 12 configures the tuner publication selector 410 to not fine-tune the model 420 on any slightly credible authoritative publications 152 (e.g., social media posts). For example, the user 12 imposes strict filtering or weighting that encourages fine-tuning with primarily highly credible authoritative publications 152, which may reduce the quantity of training samples, but increases the accuracy or quality of each training sample. On the other hand, the user may impose less strict filtering or weighting that encourages use of all of the authoritative publications 152, which may increase the quantity of the training samples, but decrease the accuracy or quality of the training samples.

Figure 5:
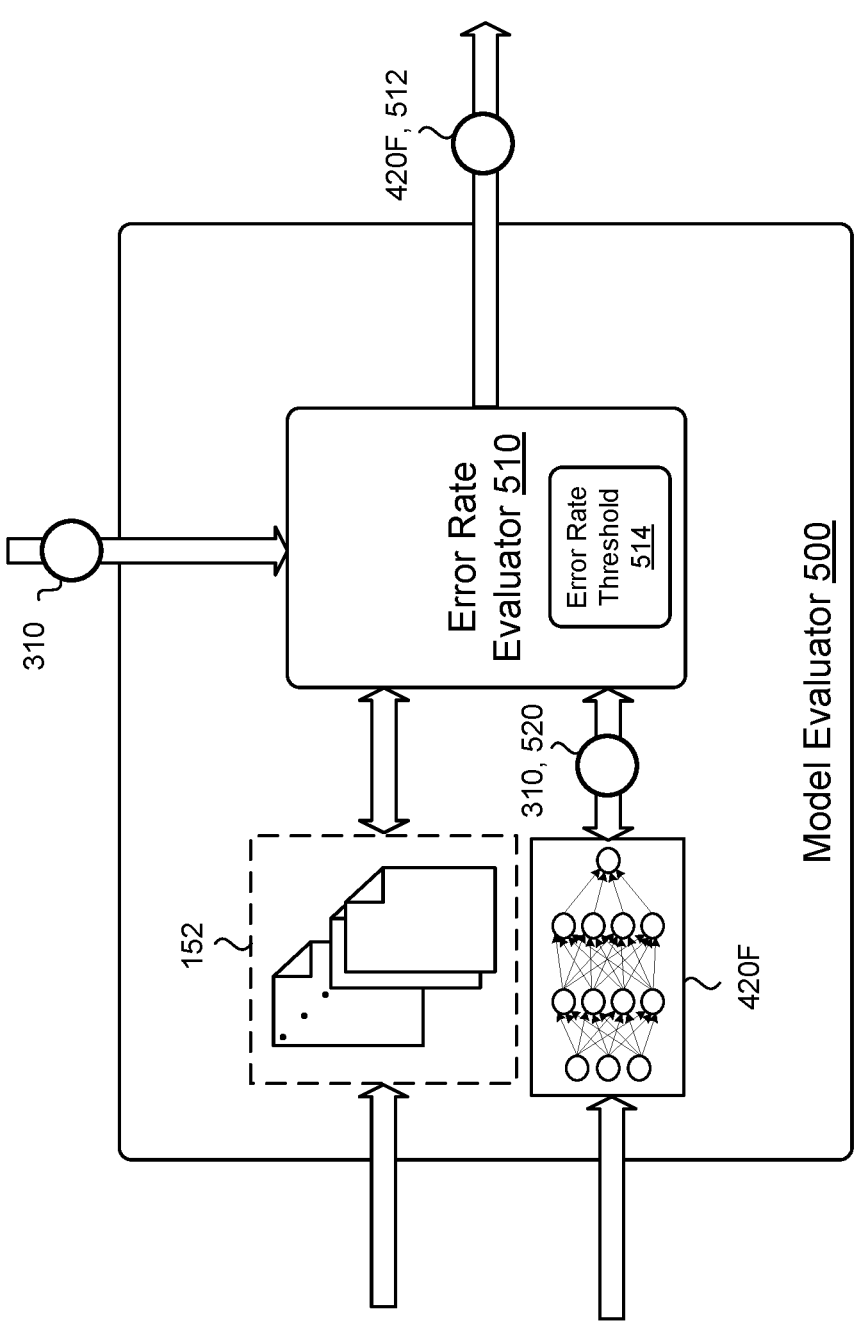
FIG. 5 is a schematic view of a model evaluator of the system of FIG. 1.

Referring now to FIG. 5, the model evaluator 500, in some implementations, includes an error rate evaluator 510. The error rate evaluator 510 queries the fine-tuned model 420F using the golden prompts 310. In response, the fine-tuned model 420F generates, for each golden prompt 310, a prediction 520. The error rate evaluator 510, in some examples, determines the error rate 512 of the fine-tuned model 420F. In some implementations, the error rate evaluator 510 determines the error rate 512 by determining an amount of matching between tokens representing the prediction 520 and tokens representing the authoritative publications 152. That is, the authoritative publications 152 and the golden prompts 310 may be tokenized (i.e., embedding the text into a vector space) and the tokens of the authoritative publications 152 compared to the tokens of the prediction 520. Each token may represent, for example, part of a word, an entire word, or more than one word of text.

The error rate evaluator 510 may determine an amount or a percentage of the tokens of the prediction 520 that also are present in the authoritative publications 152, which represents an amount of text in the prediction 520 that is also present in the authoritative publications 152. For example, when 80 percent of the tokens in the prediction 520 are present in the authoritative publications 152, the error rate evaluator 510 determines the error rate 512 for that particular golden prompt 310 is 20 percent (i.e., 20 percent of the tokens of the prediction 520 were not present in the authoritative publications 152). The error rate evaluator 510 may determine the error rate 512 of the fine-tuned model 420F based on an aggregation of the error rates 512 of each individual golden prompt 310 (e.g., an average of the error rates 512).

In some implementations, the error rate evaluator 510 determines that the error rate 512 of the fine-tuned model 420F fails to satisfy an error rate threshold 514. Based on determining that the error rate 512 fails to satisfy the error rate threshold 514, the error rate evaluator 510 removes or disregards one or more of the authoritative publications 152 (i.e., selects a proper subset of authoritative publications 152 from the set of authoritative publications 152) and generates a new set of golden prompts 310 and fine-tunes the pre-trained model 420 using the proper subset of authoritative publications 152. For example, the error rate evaluator 510 removes one or more of the least credible authoritative publications 152 in an effort to increase the accuracy of the fine-tuned model 420F. The error rate evaluator 510 may remove the authoritative publications 152 and re-train the model 420 automatically or based on user input.

The error rate evaluator 510, using the second fine-tuned model 420F and the second set of golden prompts 310, causes the fine-tuned model 420F to generate a second set of predictions 520. The error rate evaluator 510 determines, using the second set of predictions 520 and the subset of authoritative publications 152, a second error rate 512 for the second fine-tuned model 420F. The error rate evaluator 510 may continue to adjust the subset of authoritative publications and fine-tune the model until the error rate 512 meets or satisfies the error rate threshold 514. When the fine-tuned model 420F satisfies the error rate threshold 514, the error rate evaluator 510 may provide the fine-tuned model 420F and/or the error rate (e.g., to the user 12).

Figure 6:
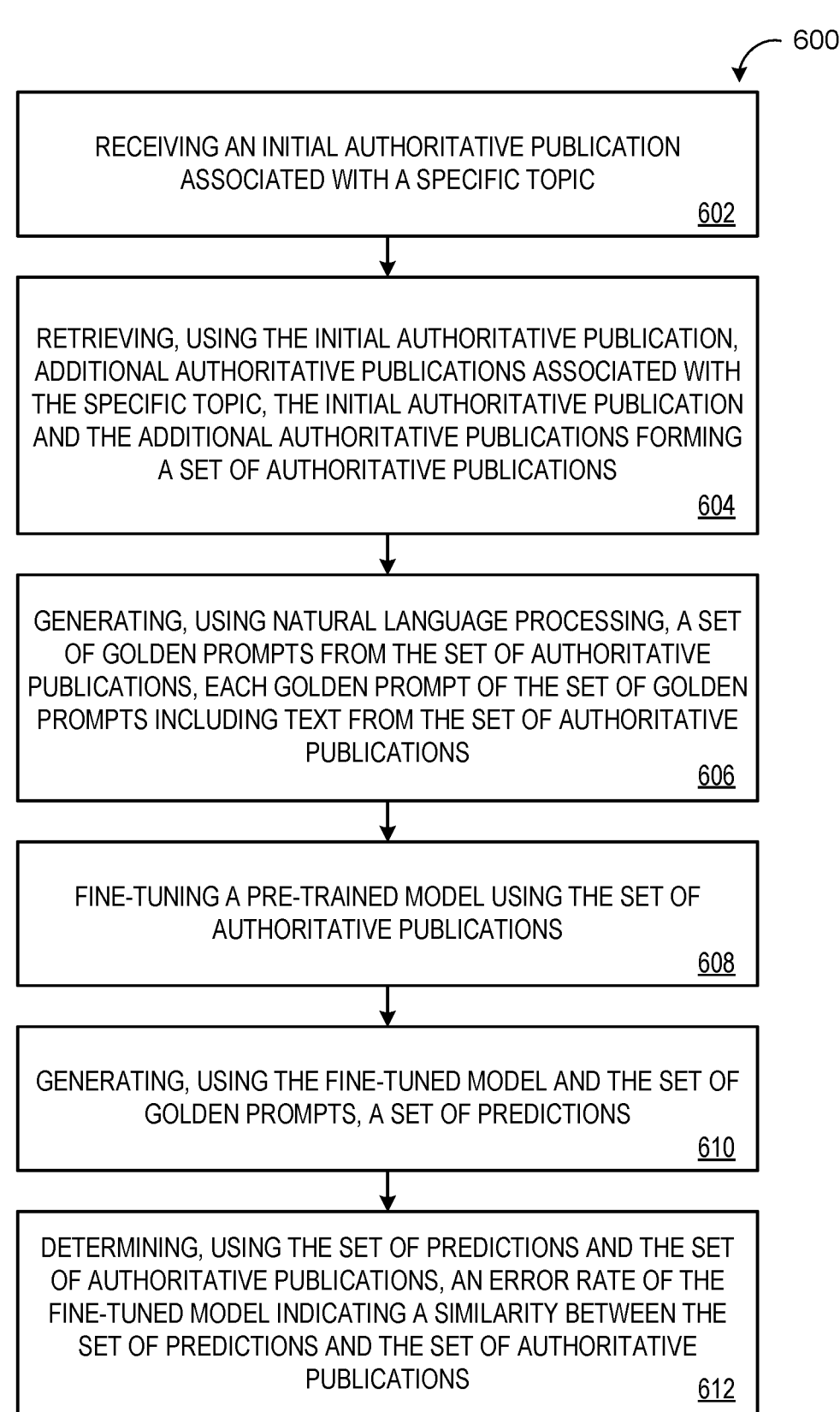
FIG. 6 is a flowchart of an example arrangement of operations for a method for golden prompt generation based on authoritative publications.

FIG. 6 is a flowchart of an exemplary arrangement of operations for a method 600 for golden prompt generation based on authoritative publications. The method 600 includes, at operation 602, receiving an initial authoritative publication 152A associated with a specific topic. At operation 604, the method 600 includes retrieving, using the initial authoritative publication 152A, additional authoritative publications 152B associated with the specific topic. The initial authoritative publication 152A and the additional authoritative publications 152B form a set of authoritative publications 152. At operation 606, the method 600 includes generating, using natural language processing, a set of golden prompts 310 from the set of authoritative publications 152. Each golden prompt 310 of the set of golden prompts 310 includes text from the set of authoritative publications 152. The method 600, at operation 608, includes fine-tuning a pre-trained model 420 using the set of authoritative publications 152. At operation 610, the method 600 includes generating, using the fine-tuned model 420F and the set of golden prompts 310, a set of predictions 520. At operation 612, the method 600 includes determining, using the set of predictions 520 and the set of authoritative publications 152, an error rate 512 of the fine-tuned model 420F. The error rate 512 indicates a similarity between the set of predictions 520 and the set of authoritative publications 152.

Figure 7:
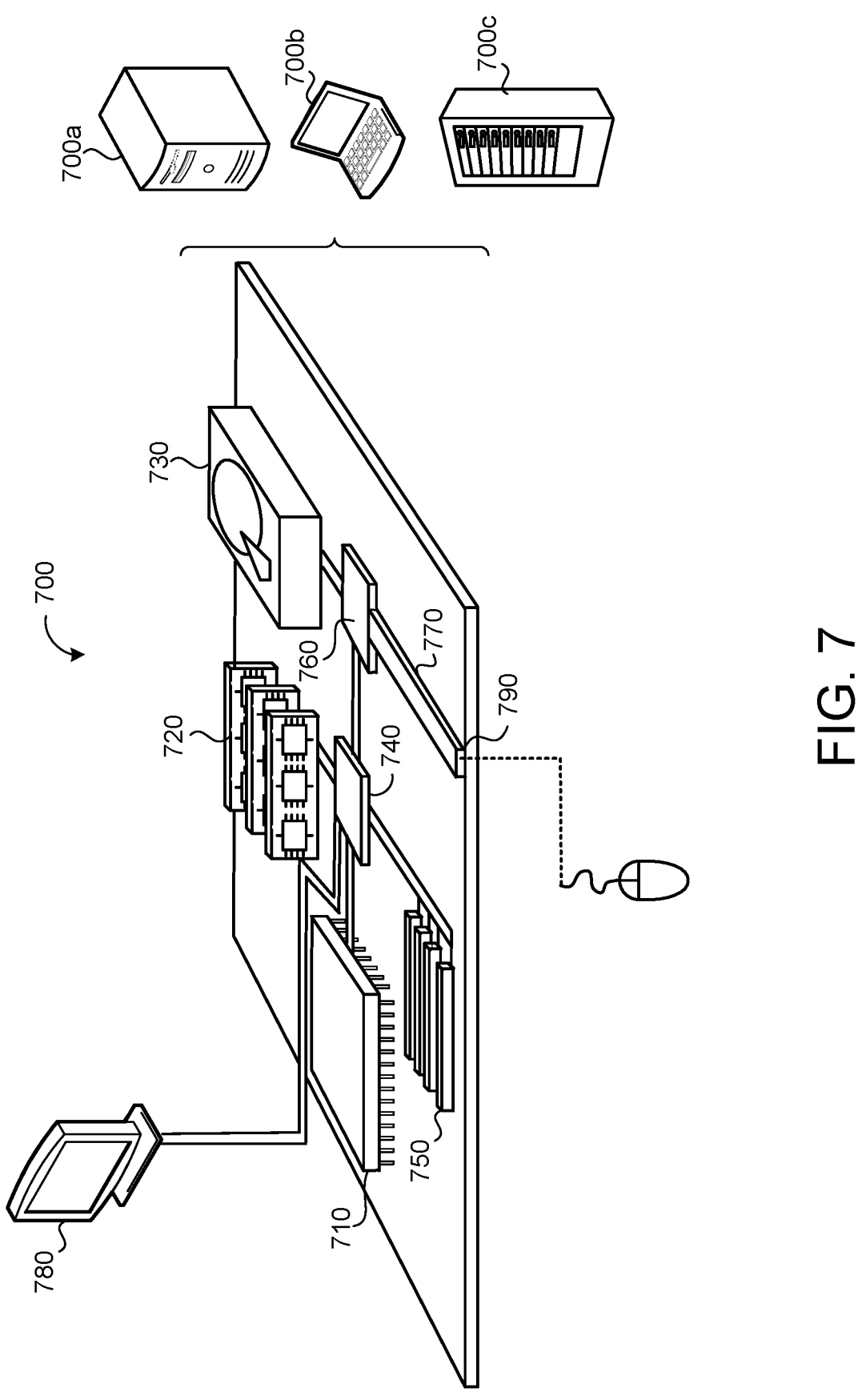
FIG. 7 is a schematic view of an example computing device that may be used to implement the systems and methods described herein.

FIG. 7 is a schematic view of an example computing device 700 that may be used to implement the systems and methods described in this document. The computing device

700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not lim- ited to, system diagnostic applications, system management applications, system maintenance applications, word pro- cessing applications, spreadsheet applications, messaging applications, media streaming applications, social network- ing applications, and gaming applications.

These computer programs (also known as programs, software, software applications or code) include machine instructions for a programmable processor, and can be implemented in a high-level procedural and/or object-ori- ented programming language, and/or in assembly/machine language. As used herein, the terms "machine-readable medium" and "computer-readable medium" refer to any computer program product, non-transitory computer read- able medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine- readable signal. The term "machine-readable signal" refers to any signal used to provide machine instructions and/or data to a programmable processor.

The processes and logic flows described in this specifi- cation can be performed by one or more programmable processors, also referred to as data processing hardware, executing one or more computer programs to perform func- tions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing com- puter program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nev- ertheless, it will be understood that various modifications may be made without departing from the spirit and scope of the disclosure. Accordingly, other implementations are within the scope of the following claims.

What is claimed is:

1. A method comprising:

receiving, by data processing hardware, an initial publi- cation associated with a specific topic;

retrieving, by the data processing hardware and using the initial publication, additional publications associated with the specific topic, the initial publication and the additional publications forming a set of publications;

generating, by the data processing hardware and using natural language processing, a set of golden prompts from the set of publications, each golden prompt of the set of golden prompts including text from the set of publications;

generating, by the data processing hardware and based on a pre-trained model, a fine-tuned model by at least weighting each publication from the set of publications to manage an impact each publication has on the fine-tuned model;

generating, by the data processing hardware and using the fine-tuned model and the set of golden prompts, a set of predictions;

determining, by the data processing hardware and using the set of predictions and the set of publications, whether an error rate of the fine-tuned model satisfies a threshold, the error rate indicating a similarity between the set of predictions and the set of publications; and responsive to determining that the error rate fails to satisfy the threshold:

selecting, by the data processing hardware, a subset of publications from the set of publications by at least removing one or more publications from the set of publications to improve an accuracy of the fine-tuned model;

generating, by the data processing hardware and using natural language processing, a second set of golden prompts from the subset of publications;

generating, by the data processing hardware and based on a second pre-trained model, a second fine-tuned model using the subset of publications;

generating, by the data processing hardware and using the second fine-tuned model and the second set of golden prompts, a second set of predictions; and determining, by the data processing hardware and using the second set of predictions and the subset of publications, a second error rate of the second fine-tuned model.

2. The method of claim 1, wherein the pre-trained model comprises a large language model.

3. The method of claim 1, wherein receiving the initial publication comprises receiving, from a user, a request to fine-tune the pre-trained model using the initial publication.

4. The method of claim 1, wherein retrieving the additional publications comprises using at least one of a search engine or a web crawler.

5. The method of claim 1, wherein retrieving the additional publications comprises searching a public database or searching a private database.

6. The method of claim 1, wherein determining the error rate comprises determining an amount of matching between tokens representing the set of predictions to tokens representing the publications.

7. The method of claim 1, wherein selecting the subset of publications is based on a credibility of each publication in the set of publications.

8. The method of claim 1, further comprising sorting, by the data processing hardware, the set of publications based on a credibility of each publication of the set of publications.

9. The method of claim 8, wherein generating a fine-tuned model is based on the credibility of each publication of the set of publications.

10. A system comprising:

data processing hardware; and memory hardware in communication with the data processing hardware, the memory hardware storing instructions that when executed on the data processing hardware cause the data processing hardware to:

receive an initial publication associated with a specific topic;

retrieve, using the initial publication, additional publications associated with the specific topic, the initial publication and the additional publications forming a set of publications;

generate, using natural language processing, a set of golden prompts from the set of publications, each golden prompt of the set of golden prompts including text from the set of publications;

generate, based on a pre-trained model, a fine-tuned model by at least weighting each publication from the set of publications to manage an impact each publication has on the fine-tuned model;

generate, using the fine-tuned model and the set of golden prompts, a set of predictions;

determine, using the set of predictions and the set of publications, whether an error rate of the fine-tuned model satisfies a threshold, the error rate indicating a similarity between the set of predictions and the set of publications; and responsive to determining that the error rate fails to satisfy the threshold:

select a subset of publications from the set of publications by at least removing one or more publications from the set of publications to improve an accuracy of the fine-tuned model;

generate, using natural language processing, a second set of golden prompts from the subset of publications;

generate, based on a second pre-trained model, a second fine-tuned model using the subset of publications;

generate, using the second fine-tuned model and the second set of golden prompts, a second set of predictions; and determine, using the second set of predictions and the subset of publications, a second error rate of the second fine-tuned model.

11. The system of claim 10, wherein the pre-trained model comprises a large language model.

12. The system of claim 10, wherein receiving the initial publication comprises receiving, from a user, a request to fine-tune the pre-trained model using the initial publication.

13. The system of claim 10, wherein retrieving the additional publications comprises using at least one of a search engine or a web crawler.

14. The system of claim 10, wherein retrieving the additional publications comprises searching a public database or searching a private database.

15. The system of claim 10, wherein determining the error rate comprises determining an amount of matching between tokens representing the set of predictions to tokens representing the publications.

16. The system of claim 10, wherein selecting the subset of publications is based on a credibility of each publication in the set of publications.

17. The system of claim 10, wherein the instructions further cause the data processing hardware to sort the set of publications based on a credibility of each publication of the set of publications.

18. The system of claim 17, wherein generating a fine-tuned model is based on the credibility of each publication of the set of publications.

* * * * *